United States Patent Office 2,706,564
Patented Apr. 19, 1955

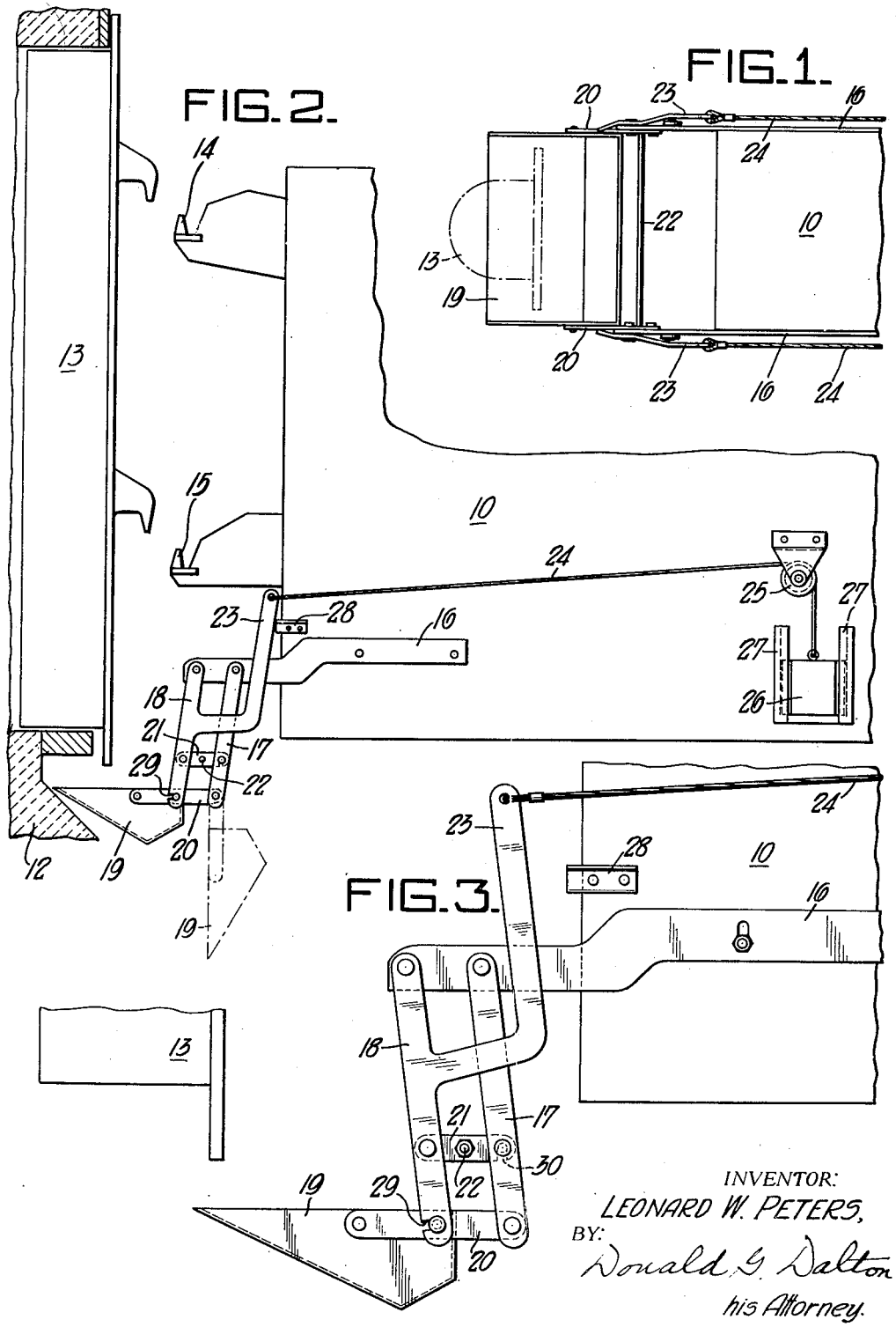

2,706,564

DRIP PAN FOR COKE OVEN DOORS

Leonard W. Peters, Cloquet, Minn., assignor to United States Steel Corporation, a corporation of New Jersey Application August 16, 1951, Serial No. 242,148

8 Claims. (Cl. 212—4)

This invention relates to a drip pan attachment for catching tar and the like from coke oven doors while they are removed from an oven for pushing coke.

Coke oven batteries commonly are equipped with a pusher machine which runs along a track parallel to the pusher side of the ovens. Such machines commonly include a door extractor, which is adapted to engage and remove doors from the ovens, and a ram which is adapted to enter the oven through the door opening after removal of the door and push the finished coke through doors on the opposite side. On removal of a door at the termination of a coking period, there is a tendency for tar to drip from the bottom of the door onto the floor beneath. Such drippings are difficult to clean, and they are dangerous to workmen and constitute a fire hazard.

An object of the present invention is to provide a drip pan attachment adapted to be installed on a door extractor of a pusher machine for catching the drippings from coke oven doors.

A further object of the invention is to provide a drip pan attachment of simple design suitable for use with various types of pusher machines and automatic in operation.

A further object is to provide a drip pan attachment adapted to be carried on a door extractor to be moved thereby into engagement with the bottom of an oven door opening for catching drippings, to stay in that position until the door is fully removed, and to remain beneath the door until the latter is replaced.

In accomplishing these and other objects of the invention, I have provided improved details of structure, a single form of which is shown in the accompanying drawing, in which:

Figure 1 is a top plan view of a door extractor equipped with a drip pan attachment which embodies features of the present invention;

Figure 2 is a side elevational view of the extractor engaging a door and showing the drip pan attachment underneath; and Figure 3 is a side elevational view of the drip pan on a larger scale.

Figures 1 and 2 show somewhat schematically a door extractor head 10 of a coke pusher machine and a coke oven 12 which has a door 13. The head 10 is movable toward and away from the oven and carries means, such as a top hook 14 and a bottom hook 15, for engaging and carrying the door. These parts are not shown in greater detail for the reason that they can be of any standard or desired construction and are not part of the present invention.

The drip pan attachment comprises a pair of supporting arms 16 fixed to opposite sides of the extractor head 10. Downwardly depending back and front links 17 and 18 are pivoted to these arms. The actual pan 19 carries rearwardly extending arms 20 which are pivoted to the lower ends of the links 17 and 18. Preferably horizontal braces 21 are pivotally connected between each pair of links 17 and 18, and the two braces 21 on opposite sides are connected by a rod 22. The two sets of arms 16 and 20, links 17 and 18 and braces 21 thus form parallelogram linkages which permit the head 10 to move back and forth with respect to the pan, but always keep the pan horizontal.

Each of the front links 18 carries an upstanding lever arm 23. Cables 24 are attached at one end to the upper ends of said lever arms, run over sheaves 25 rotatably mounted on the rearward portion of the head 10, and are connected at their other end to weights 26. Said weights are mounted for vertical movement in guides 27 fixed to the sides of the head 10. The front edges of the head 10 carry stops 28 with which the lever arms 23 are engageable to limit forward movement of the pan with respect to the head 10.

Normally the weights 26 hold the pan 19 in its most forward position with respect to the head 10, in which the lever arms 23 abut the stops 28 (Figure 2). As the head 10 advances to engage a door 13, the pan 19 moves therewith until the forward edge of the pan engages the coke oven wall beneath the door opening. Thereafter the head continues to advance until its engaging means picks up the door. The parallelogram linkages permit the head to advance thus while the pan remains stationary against the oven wall. After the head picks up the door, it retracts and carries the door to a position directly over pan 19. The door and the pan then remain in this relation as long as the head carries the door and thus the pan catches any drippings from the door.

For cleaning the pan, the pivotal connections between the front links 18 and arms 20 and also between the braces 21 and back links 17 can be detached. The lower ends of the front links are slotted as indicated at 29 and the back ends of the braces are slotted as indicated at 30 to permit such detachment. On manual detachment of these pivotal connections, the pan drops to a vertical position in which it can be cleaned easily, as shown in dot-dash lines in Figure 2. After cleaning these connections can easily be reattached.

From the foregoing description it is seen that the present invention affords a simple pan attachment for catching drippings from coke oven doors. The mechanism is fully automatic in its operation and can be installed on existing door handling mechanisms without otherwise altering their structure.

While I have shown and described only a single embodiment of the invention, it is apparent that modifications may arise. Therefore, I do not wish to be limited to the disclosure set forth but only by the scope of the appended claims.

I claim:

1. A drip pan attachment comprising support means adapted to be fixed to the extractor head of a coke pusher machine, a pan, a linkage mounting said pan on said support means so that the pan can move with the extractor head into engagement with an oven wall but the extractor head can also move relative to the pan, and means for urging said pan forwardly with respect to the extractor head.

2. A drip pan attachment comprising support means adapted to be fixed to the extractor head of a coke pusher machine, a pan, a parallelogram linkage mounting said pan on said support means so that it depends therefrom and can move with the extractor head into engagement with an oven wall but the extractor head can also move relative to the pan, and means connected to said linkage for urging said pan forwardly with respect to the extractor head.

3. A drip pan attachment comprising a pair of spaced apart supporting arms adapted to be fixed to the extractor head of a coke pusher machine, back and front links pivotally attached to each of said arms and depending therefrom, a pan pivotally attached to the lower ends of said links, and means connected to the links for urging said pan forwardly with respect to the extractor head, said pan normally moving with the extractor head but said links permitting relative movement between the pan and head.

4. A drip pan attachment comprising a pair of spaced apart supporting arms adapted to be fixed to the extractor head of a coke pusher machine, back and front links pivotally attached to each of said arms and depending therefrom, a pan pivotally attached to the lower ends of said links, upwardly extending lever arms on the links on opposite sides, and cables and weights connects to said lever arms for urging said pan forwardly with respect to the extractor head, said pan normally moving with the extractor head but said links permitting relative movement between the pan and head.

5. A drip pan attachment comprising a pair of spaced apart supporting arms adapted to be fixed to the extractor head of a coke pusher machine, back and front links pivotally attached to each of said arms, a pan pivotally attached to the lower ends of said links, and means connected to the links for urging said pan forwardly with respect to the extractor head, said pan normally moving with the extractor head but said links permitting relative movement between the pan and head, the pivotal connections between said front links and said pan being detachable for dropping said pan for cleaning.

6. The combination with a coke pusher machine which includes a horizontally movable extrator head adapted to engage and carry coke oven doors, of a drip pan attachment comprising a linkage attached to said extractor head, a drip pan carried by said linkage and being movable relative to said extractor head to enable the extractor head to engage a coke oven door, and means urging said pan to a position beyond said extractor head where it can underlie a door carried thereby.

7. The combination with a coke pusher machine which includes a horizontally movable extractor head adapted to engage and carry coke oven doors, of a drip pan attachment comprising support means fixed to said head, a linkage depending from said support means, a pan connected to said linkage, and means urging said pan forwardly with respect to said head, said pan normally moving with said head but said linkage permitting relative movement between the pan and head.

8. The combination with a coke pusher machine which includes a horizontally movable extractor head adapted to engage and carry coke oven doors, of a drip pan attachment comprising support means fixed to opposite sides of said head, back and front links pivotally attached to said support means and depending therefrom, a pan pivotally attached to the lower ends of said links, and cables and weights attached to the links and to said head urging said pan forwardly with respect to said head, said pan normally moving with said head but said links permitting relative movement between the pan and head.

References Cited in the file of this patent

UNITED STATES PATENTS

| 115,079 | McCloy | May 23, 1871 |
| 1,872,020 | Taylor | Aug. 16, 1932 |
| 2,224,392 | Imes | Dec. 10, 1940 |
| 2,268,316 | Taylor | Dec. 30, 1941 |
| 2,293,434 | Giese | Aug. 18, 1942 |

FOREIGN PATENTS

| 138,422 | Great Britain | Feb. 12, 1920 |
| 394,008 | Great Britain | June 19, 1933 |
| 559,102 | Germany | Sept. 15, 1932 |